United States Patent
Courtright et al.

(10) Patent No.: US 10,145,076 B2
(45) Date of Patent: Dec. 4, 2018

(54) SHEET PILE BULKHEAD SYSTEMS AND METHODS

(71) Applicant: PND Engineers, Inc., Anchorage, AK (US)

(72) Inventors: Charles D. Courtright, Anchorage, AK (US); Dempsey S. Thieman, Anchorage, AK (US)

(73) Assignee: PND ENGINEERS, INC., Anchorage, AK (US)

(*) Notice: Subject to any disclaimer, the term of this patent is extended or adjusted under 35 U.S.C. 154(b) by 0 days.

(21) Appl. No.: 15/236,272

(22) Filed: Aug. 12, 2016

(65) Prior Publication Data
US 2018/0044874 A1  Feb. 15, 2018

(51) Int. Cl.
| | | |
|---|---|---|
| *E02D 5/02* | (2006.01) | |
| *E02D 5/10* | (2006.01) | |
| *E02D 5/04* | (2006.01) | |
| *E02D 5/08* | (2006.01) | |
| *E02D 5/14* | (2006.01) | |
| *E02D 5/03* | (2006.01) | |
| *E02D 5/12* | (2006.01) | |
| *E02D 5/52* | (2006.01) | |
| *E02D 5/64* | (2006.01) | |

(52) U.S. Cl.
CPC .............. *E02D 5/14* (2013.01); *E02D 5/03* (2013.01); *E02D 5/08* (2013.01); *E02D 5/12* (2013.01); *E02D 5/52* (2013.01); *E02D 5/64* (2013.01)

(58) Field of Classification Search
CPC .... E02D 5/02; E02D 5/10; E02D 5/04; E02D 5/08; E02D 5/14
USPC ................................................ 405/274–281
See application file for complete search history.

(56) References Cited

U.S. PATENT DOCUMENTS

| | | | | |
|---|---|---|---|---|
| 1,032,109 A | * | 7/1912 | Buckingham | E02D 5/08 405/279 |
| 1,391,380 A | * | 9/1921 | Griesser | E02D 23/16 405/11 |
| 1,790,438 A | * | 1/1931 | Nolte | E02D 5/08 405/279 |
| 1,851,864 A | * | 3/1932 | Nolte | E02D 5/08 405/279 |
| 2,050,934 A | * | 8/1936 | Ditchburn | E02D 5/04 405/281 |
| 2,128,428 A | * | 8/1938 | Murray, Jr. | E02D 5/04 405/278 |
| 2,806,561 A | * | 9/1957 | Spangler | E01C 9/083 405/277 |
| 2,880,589 A | * | 4/1959 | Wilson | E02D 5/04 405/281 |
| 3,688,508 A | * | 9/1972 | Taylor | E02D 5/08 405/278 |

(Continued)

*Primary Examiner* — Benjamin F Fiorello
*Assistant Examiner* — Edwin J Toledo-Duran
(74) *Attorney, Agent, or Firm* — Davis Wright Tremaine LLP; Heather M. Colburn

(57) ABSTRACT

A system that includes a plurality of front faces configured to be arranged end-to-end in a series. Adjacent front faces are connected together by a different X-shaped or X-wye connector that facilitates installation of reinforcement tail walls. At least one tail wall is connected to each connector. A redundant reinforcing tail wall may be constructed and attached to one of the connectors to provide alternative load path(s).

18 Claims, 10 Drawing Sheets

(56) References Cited

U.S. PATENT DOCUMENTS

| | | | | |
|---|---|---|---|---|
| 3,798,914 A | * | 3/1974 | Irwin-Childs | E02D 5/04 405/267 |
| 4,110,990 A | * | 9/1978 | Thompson | E02D 5/64 405/14 |
| 4,674,921 A | * | 6/1987 | Berger | E02B 3/066 405/262 |
| 4,917,543 A | * | 4/1990 | Cole | E02D 5/04 256/73 |
| 5,320,440 A | * | 6/1994 | Papadopoulos | E04G 1/12 405/272 |
| 5,333,971 A | * | 8/1994 | Lewis | E02D 5/28 405/274 |
| 5,344,258 A | * | 9/1994 | Papadopoulos | E04G 1/12 403/353 |
| 5,902,074 A | * | 5/1999 | Berkley | E02D 5/03 405/274 |
| D464,738 S | * | 10/2002 | Wall | D25/61 |
| D465,580 S | * | 11/2002 | Wall | D25/61 |
| D472,455 S | * | 4/2003 | Wall | D25/119 |
| 6,715,964 B2 | * | 4/2004 | Nottingham | E02D 5/02 405/278 |
| D517,905 S | * | 3/2006 | Wall | D8/382 |
| D521,365 S | * | 5/2006 | Wall | D8/382 |
| D527,248 S | * | 8/2006 | Heindl | D8/382 |
| 7,168,214 B2 | * | 1/2007 | Wall | E02D 5/08 403/122 |
| D540,660 S | * | 4/2007 | Heindl | D8/382 |
| D540,661 S | * | 4/2007 | Heindl | D8/382 |
| D541,639 S | * | 5/2007 | Heindl | D8/382 |
| D541,640 S | * | 5/2007 | Heindl | D8/382 |
| D542,634 S | * | 5/2007 | Heindl | D8/382 |
| D542,635 S | * | 5/2007 | Heindl | D8/382 |
| D542,636 S | * | 5/2007 | Heindl | D8/382 |
| D542,637 S | * | 5/2007 | Heindl | D8/382 |
| D542,638 S | * | 5/2007 | Heindl | D8/382 |
| D542,639 S | * | 5/2007 | Heindl | D8/382 |
| D542,640 S | * | 5/2007 | Heindl | D8/382 |
| D542,641 S | * | 5/2007 | Heindl | D8/382 |
| D543,097 S | * | 5/2007 | Heindl | D8/382 |
| D543,098 S | * | 5/2007 | Heindl | D8/382 |
| D543,841 S | * | 6/2007 | Heindl | D8/382 |
| D579,578 S | * | 10/2008 | Chaney | D25/119 |
| D587,819 S | * | 3/2009 | Ryan | D25/119 |
| 7,753,623 B2 | * | 7/2010 | Heindl | E02D 5/08 405/279 |
| D621,245 S | * | 8/2010 | Heindl | D8/382 |
| D621,246 S | * | 8/2010 | Heindl | D8/382 |
| D621,247 S | * | 8/2010 | Heindl | D8/382 |
| D621,248 S | * | 8/2010 | Heindl | D8/382 |
| D621,249 S | * | 8/2010 | Heindl | D8/382 |
| D621,250 S | * | 8/2010 | Heindl | D8/382 |
| D621,251 S | * | 8/2010 | Heindl | D8/382 |
| D621,252 S | * | 8/2010 | Heindl | D8/382 |
| D622,579 S | * | 8/2010 | Heindl | D8/382 |
| D623,930 S | * | 9/2010 | Austro | D8/382 |
| D623,931 S | * | 9/2010 | Austro | D8/382 |
| D623,932 S | * | 9/2010 | Austro | D8/382 |
| D624,395 S | * | 9/2010 | Austro | D8/382 |
| D626,826 S | * | 11/2010 | Austro | D8/382 |
| 7,946,791 B2 | * | 5/2011 | Heindl | E02D 5/08 405/274 |
| D640,535 S | * | 6/2011 | Austro | D8/382 |
| D649,443 S | * | 11/2011 | Heindl | D8/382 |
| 8,088,469 B2 | * | 1/2012 | Heindl | E02D 5/06 405/274 |
| D665,658 S | * | 8/2012 | Heindl | D8/382 |
| D665,659 S | * | 8/2012 | Heindl | D8/382 |
| D665,660 S | * | 8/2012 | Heindl | D8/382 |
| D666,484 S | * | 9/2012 | Heindl | D8/382 |
| D681,424 S | * | 5/2013 | Heindl | D8/382 |
| D681,425 S | * | 5/2013 | Heindl | D8/382 |
| D681,426 S | * | 5/2013 | Heindl | D8/382 |
| D681,427 S | * | 5/2013 | Heindl | D8/382 |
| D681,428 S | * | 5/2013 | Heindl | D8/382 |
| D681,429 S | * | 5/2013 | Heindl | D8/382 |
| D681,430 S | * | 5/2013 | Heindl | D8/382 |
| D681,431 S | * | 5/2013 | Heindl | D8/382 |
| D681,432 S | * | 5/2013 | Heindl | D8/382 |
| D681,433 S | * | 5/2013 | Heindl | D8/382 |
| D734,137 S | * | 7/2015 | McShane | D8/382 |
| D737,673 S | * | 9/2015 | McShane | D8/382 |
| 2002/0102131 A1 | * | 8/2002 | Wall | E02D 5/08 403/363 |
| 2004/0013474 A1 | * | 1/2004 | Weyant | E02D 5/16 405/276 |
| 2005/0058514 A1 | * | 3/2005 | Moreau | E02D 5/04 405/277 |
| 2005/0271467 A1 | * | 12/2005 | Ong | E02D 5/08 403/359.1 |
| 2007/0003379 A1 | * | 1/2007 | Wall | E02D 5/08 405/279 |
| 2007/0217870 A1 | * | 9/2007 | Davidsaver | E02B 3/06 405/284 |
| 2008/0145153 A1 | * | 6/2008 | Wendt | E02B 3/108 405/274 |
| 2008/0152435 A1 | * | 6/2008 | Heindl | E02D 5/06 405/274 |
| 2008/0170913 A1 | * | 7/2008 | Moreau | E02B 3/066 405/279 |
| 2008/0219776 A1 | * | 9/2008 | Heindl | E02D 5/08 405/279 |
| 2008/0310924 A1 | * | 12/2008 | Heindl | E02D 5/08 405/279 |
| 2009/0123237 A1 | * | 5/2009 | Heindl | E02D 5/08 405/274 |
| 2011/0064527 A1 | * | 3/2011 | Nottingham | E02D 5/02 405/274 |
| 2011/0088348 A1 | * | 4/2011 | Rahimzadeh | E04B 1/30 52/649.2 |
| 2013/0014453 A1 | * | 1/2013 | Hargrave | E02D 5/60 52/101 |
| 2014/0112725 A1 | * | 4/2014 | Wendt | E02D 5/06 405/279 |
| 2015/0010366 A1 | * | 1/2015 | McShane | E02D 5/16 405/279 |

\* cited by examiner

SHEET PILE BULKHEAD SYSTEMS AND METHODS

BACKGROUND OF THE INVENTION

Field of the Invention

The present invention is directed generally to systems and methods for constructing cellular sheet pile bulkheads.

Description of the Related Art

Sheet piling may be used to construct a bulkhead or retaining wall. In a sheet pile structure, a plurality of sheet pile sections having interlocking edges are connected together and arranged to define a perimeter and load resisting elements of the bulkhead. A marine or coastal bulkhead (sometimes referred to as a seawall) is a type of retaining wall that may be used to shape a shoreline for shipping and/or erosion prevention. In particular, such a bulkhead may be used in the construction of a dock or port.

FIG. 1 is a top view of a prior art bulkhead 2 installed between land 4 and water 6. The bulkhead 2 was constructed using a system 10 that includes a plurality of curved front faces 12A-12C anchored to the land 4 by a plurality of substantially linear tail walls 14A-14D. Together, the front faces 12A-12C define a boundary between the land 4 and the water 6. Soil anchors 16A-16D may be connected to and/or integrated into the tail walls 14A-14D, respectively.

The front faces 12A-12C and the tail walls 14A-14D define a plurality of U-shaped open cell structures 15A-15C. In FIG. 1, the front face 12A and the tail walls 14A and 14B define the first open cell structure 15A, the front face 12B and the tail walls 14B and 14C define the second open cell structure 15B, and the front face 12C and the tail walls 14C and 14D define the third open cell structure 15C. While FIG. 1 depicts only the three open cell structures 15A-15C, the bulkhead 2 may include any number of open cell structures. Each of the cell structures 15A-15C functions as a membrane that retains material (e.g., soil) from the land 4 therein. For example, material (e.g., soil) inside the cell structure 15B presses outwardly against the front face 12B and is supported by the tail walls 14B and 14C.

Unfortunately, because the front faces 12A-12C are under tension, one or more of the front faces 12A-12C may rupture when damaged (e.g., by a collision with a ship) allowing material (e.g., soil) to spill out (e.g., into the water 6) through the rupture. Further, the water 6 may flush material out of the ruptured cell structure(s) limiting the use or compromising the integrity of the system. Repairing the rupture may be difficult because material must be removed from one or more of the cell structures 15A-15C and/or the structure otherwise supported (e.g., by retaining wall(s) added inside one or more of the cell structures 15A-15C) to allow the repairs. Because the cell structures 15A-15C are interconnected, sometimes material must be removed and/or an additional retaining wall system installed within multiple (e.g., 5-8 different) cell structures even though some of these cell structures did not rupture and/or were not damaged.

Therefore, a need exists for new open cell sheet pile retaining systems. Systems configured to be more easily repaired and/or systems that do not require repair if ruptured, are particularly desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
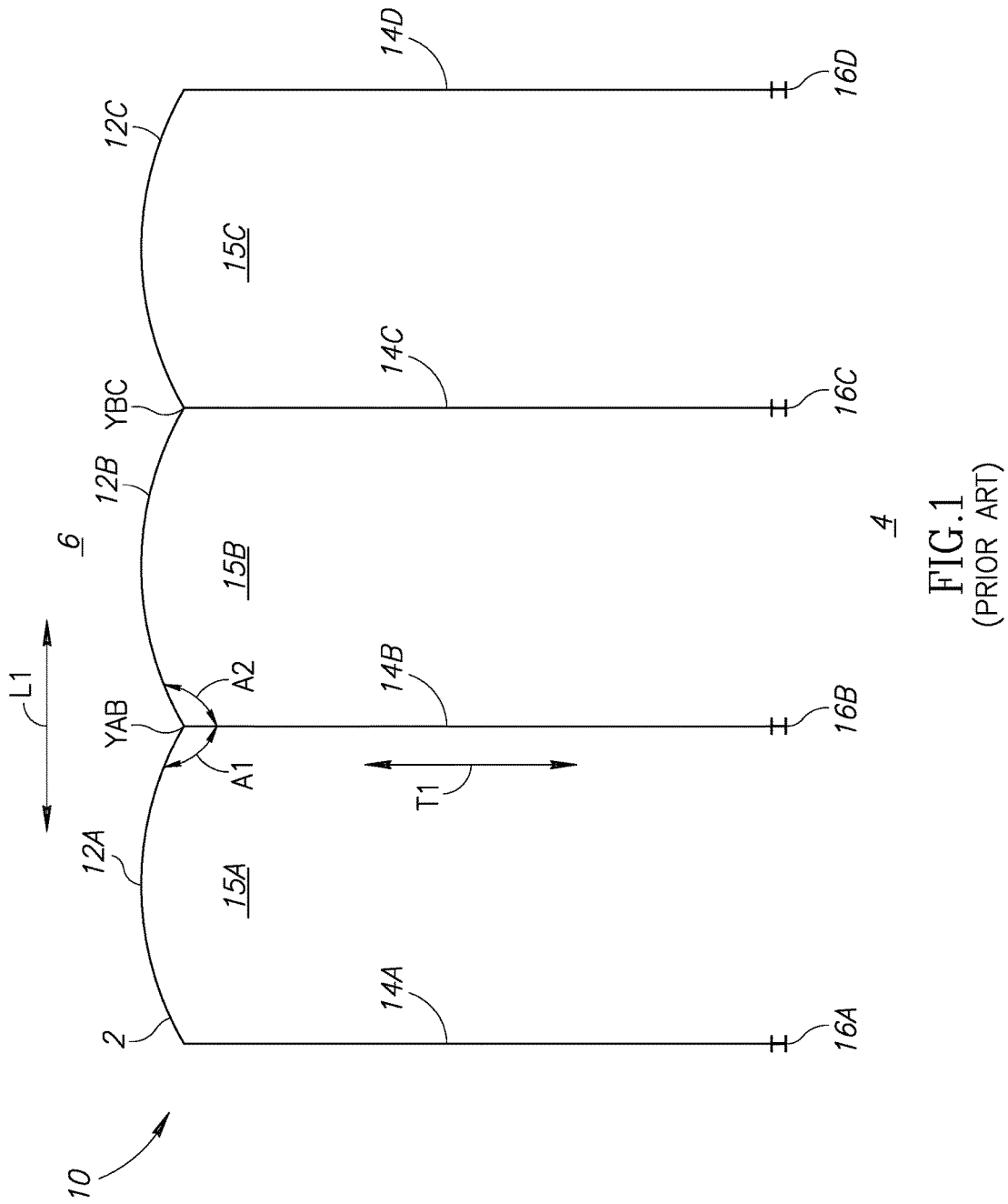
FIG. 1 is a top view of a prior art bulkhead.

Referring to FIG. 1, adjacent front faces 12A-12C in the prior art system 10 are coupled to a shared tail wall. For example, the front faces 12A and 12B are both connected to the shared tail wall 14B by a first Y-shaped wye pile or connector YAB. Similarly, the front faces 12B and 12C are both connected to the shared tail wall 14C by a different second Y-shaped wye pile or connector YBC. The wye connectors YAB and YBC are substantially identical to one another. Therefore, for the sake of brevity, only the wye connector YAB will be described in detail.

The Y-shape of the wye connector YAB balances the forces at the junction of the pair of adjacent front faces 12A and 12B and their shared tail wall 14B. For the purposes of illustration, force components extending in directions (identified by a double headed arrow "T1") that are substantially parallel with the tail wall 14B will be referred to as being transverse components, and force components extending in directions (identified by a double headed arrow "L1") substantially orthogonal with the transverse components will be referred to as being longitudinal components. At the wye connector YAB, a first inside angle A1 is defined between the front face 12A and the shared tail wall 14B, and a second inside angle A2 is defined between the front face 12B and the shared tail wall 14B. The first and second inside angles A1 and A2 are approximately equal, which balances the longitudinal components (in the directions identified by the double headed arrow "L1") of the face tensile load and allows transmission of only the transverse components (in the directions identified by the double headed arrow "T1") to the tail wall 14B. If the structural integrity of one of the front faces 12A and 12B is compromised (and is thereby not transferring or resolving load), the wye connectors YAB and YBC as well as the tail walls 14A-14D of the system 10 are subjected to an unbalanced load. In other words, each of the cell structures 15A-15C is dependent upon adjacent ones of the cell structures to balance forces developed within the cell. These forces must be rebalanced to repair the rupture.

Figure 2:
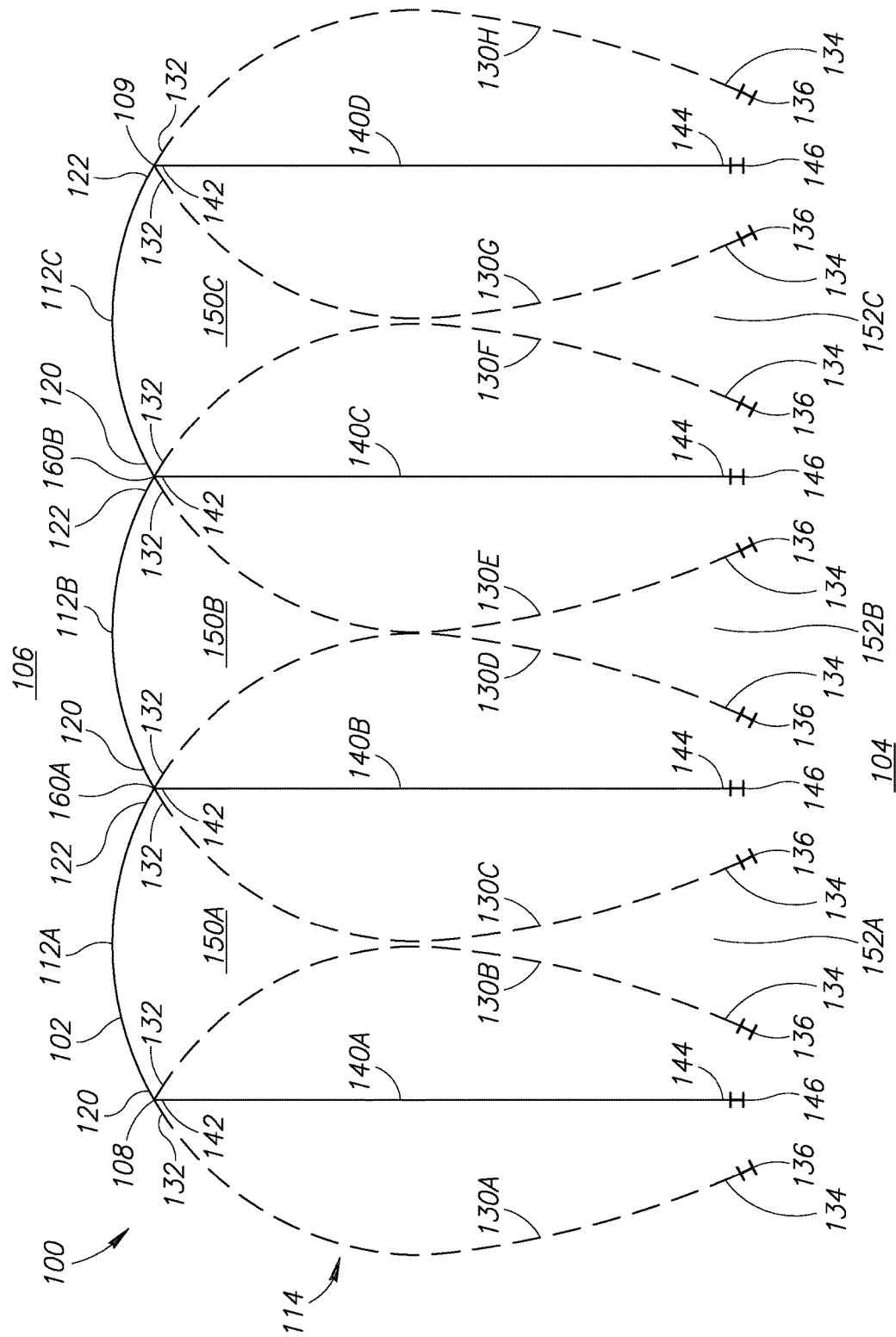
FIG. 2 is a top view of a redundant open cell sheet pile retaining system used to construct a bulkhead.
Figure 10:
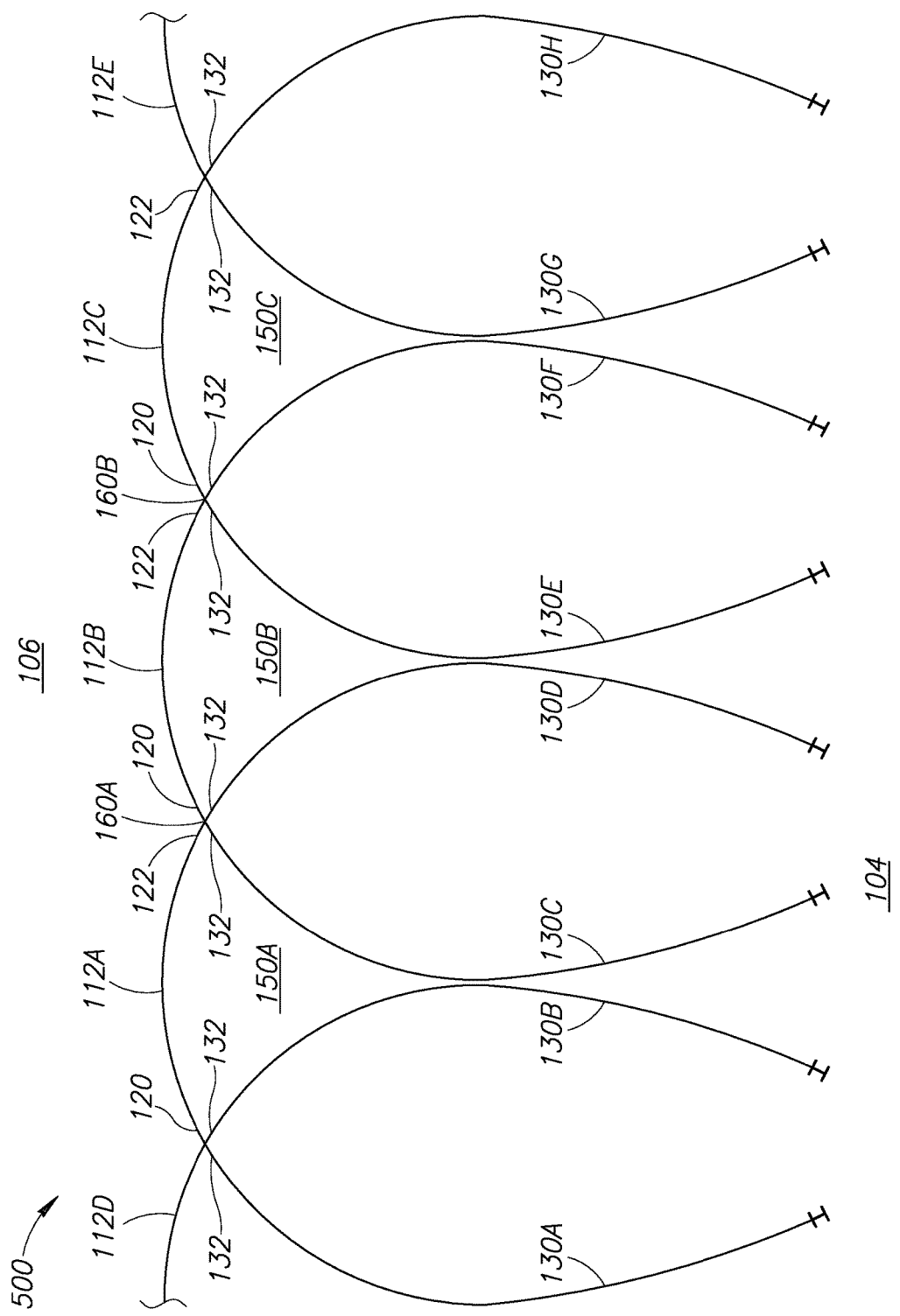
FIG. 10 is a top view of an alternate embodiment of a bulkhead constructed using the redundant open cell sheet pile retaining system of FIG. 2.

FIG. 2 is a top view of an open cell sheet pile retaining system 100 used to construct a bulkhead (e.g., a bulkhead 102, a bulkhead 500 depicted in FIG. 10, and the like). For ease of illustration, the bulkhead (e.g., the bulkhead 102, the bulkhead 500 depicted in FIG. 10, and the like) will be described as being constructed at a shoreline between land 104 and water 106. However, the system 100 is not limited to use at a shoreline. As is appreciated by those of ordinary skill in the art, the system 100 may be used to construct a bulkhead at other locations as well as other types of boundaries and structures. By way of non-limiting examples, the system 100 may be used to build retaining walls on land, levees, docks, bridge abutments, fish passages, in-take structures, soil containment barriers, elevated platforms, man-made islands, erosion protection, artificial reefs, cofferdams, dams, and the like. While the bulkheads 102 and 500 have been illustrated as extending along a substantially straight line, this is not a requirement. As is appreciated by those of ordinary skill in the art, the bulkheads 102 and 500 may be contoured and/or may include one or more bends, corners, and/or curves. Further, the bulkhead 102 need not terminate at first and second ends 108 and 109. The bulkheads 102 and 500 may be continuous and define a closed shape (e.g., a man-made island or cofferdam).

Referring to FIG. 2, the system 100 includes a plurality of curved front faces 112A-112C anchored to the land 104 by a plurality of tail walls 114. Each of the front faces 112A-112C and each of the tail walls 114 is constructed using one or more conventional flat web sheet pile sections (e.g., like sheet pile sections 115A-115E illustrated in FIGS. 3 and 6) that are interlocked together along their edges. The tail walls 114 extend into the land 104 and are typically buried underground. While the system 100 has been illustrated as including the three front faces 112A-112C and the twelve tail walls 114, as is appreciated by those of ordinary skill in the art, the system 100 may include any number of front faces and tail walls.

The front faces 112A-112C are arranged in a series and connected together end-to-end to define a boundary (e.g., between the land 104 and the water 106). Each of the front faces 112A-112C has a tethered first end 120 opposite a tethered second end 122. Each the first and second ends 120 and 122 of each of the front faces 112A-112C is tethered to one, two, or three of the tail walls 114. When more than a single tail wall is coupled to the same end of the same front face to provide alternative load paths, those tail walls are referred to as being redundant. This redundancy may eliminate or reduce an imbalance in the forces within the system 100 when one of the front faces 112A-112C is ruptured.

The tail walls 114 may optionally include a plurality of curved tail walls 130A-130H. The curved tail walls 130A, 130C, 130E, and 130G may be substantially identical to and parallel with one another, and the curved tail walls 130B, 130D, 130F, and 130H may be substantially identical to and parallel with one another. Further, the curved tail walls 130A, 130C, 130E, and 130G may be mirror images of the curved tail walls 130B, 130D, 130F, and 130H, respectively. Each of the curved tail walls 130A-130H has a tethered end 132 opposite a free end 134. One or more soil anchors 136 may be connected to and/or integrated into each of the curved tail walls 130A-130H. By way of a non-limiting example, a different one of the soil anchors 136 may be connected to the free end 134 of each of the curved tail walls 130A-130H.

The tail walls 114 may optionally include one or more tail walls 140A-140D substantially identical to the tail walls 14A-14D (see FIG. 1). The tail walls 140A-140D may be substantially linear and substantially identical to one another. In the example illustrated, the tail walls 140A-140D are substantially parallel with one another. However, this is not a requirement. Each of the tail walls 140A-140D has a tethered end 142 opposite a free end 144. One or more soil anchors 146 may be connected to and/or integrated into each of the tail walls 140A-140D. By way of a non-limiting example, a different one of the soil anchors 146 may be connected to the free end 144 of each of the tail walls 140A-140D.

As originally constructed, the bulkhead 102 includes the curved front faces 112A-112C and the tail walls 140A-140D. If the bulkhead 102 is later damaged, one or more of the curved tail walls 130A-130H may be added to the bulkhead 102. For example, one or both of the optional curved tail walls 130A and 130B may be positioned on either side of tail wall 140A. By way of another non-limiting example, one or both of the optional curved tail walls 130C and 130D may be positioned on either side of tail wall 140B. By way of yet another non-limiting example, one or both of the optional curved tail wall 130E and 130F may be positioned on either side of tail walls 140C. By way of yet another non-limiting example, one or both of the optional curved tail walls 130G and 130H may be positioned on either side of tail walls 140D.

Alternatively, referring to FIG. 10, as originally constructed, the bulkhead 500 may include the curved front faces 112A-112C and the curved tail walls 130A-130H. If the bulkhead 500 is later damaged, repairs to the bulkhead 500 are not required or may be made, if desired, more easily.

Returning to FIG. 2, each of the curved front faces 112A-112C defines a portion of a different open cellular structure or open cell. In the example illustrated, the front faces 112A-112C define portions of the open cells 150A-150C, respectively. The open cells 150A-150C have openings 152A-152C, respectively, opposite the front faces 112A-112C, respectively.

The sides of each of the open cells 150A-150C are defined by one or more of the tail walls 114. For example, first and second sides of the first open cell 150A may be defined by one or more of the tail walls 114 coupled to the first and second ends 120 and 122, respectively, of the front face 112A. Similarly, first and second sides of the second open cell 150B may be defined by one or more of the tail walls 114 coupled to the first and second ends 120 and 122, respectively, of the front face 112B. Additionally, first and second sides of the second open cell 150C may be defined by one or more of the tail walls 114 coupled to the first and second ends 120 and 122, respectively, of the front face 112C.

By way of a non-limiting example, referring to FIG. 10, the curved tail walls 130A and 130D may define the first and second sides, respectively, of the open cell 150A, and the curved tail walls 130C and 130F may define the first and second sides, respectively, of the open cell 150B. In this example, the open cell 150A overlaps with the open cell 150B. Further, the curved tail walls 130E and 130H may define the first and second sides, respectively, of the open cell 150C that overlaps with the open cell 150B. The first and second sides of each of the open cells 150A-150C counteract and balance longitudinal components of forces applied to the front face 112A, 112B, or 112C of the open cell. Thus, adjacent front faces are not needed to balance the longitudinal components within the bulkhead 500. In other words, each of the open cells 150A-150C may be characterized being self-supporting and independent because each of the open cells 150A-150C is not dependent on any adjacent open cells to balance forces developed within the open cell itself.

However, referring to FIG. 2, those of ordinary skill in the art will readily recognize that the front faces 112A-112C, the curved tail walls 130A-130H, and the tail walls 140A-140D may be combined to define alternately configured open cells and such alternative configurations are within the scope of the present teachings.

The open cells 150A-150C are each filled with material (e.g., soil) that pushes on and applies a forwardly directed force (e.g., in a direction toward the water 106) on the front faces 112A-112C, which causes tension in the front faces 112A-112C. The tail walls 114 balance (or counteract) the forwardly directed force applied to the front faces 112A-112C and prevent the front faces 112A-112C from being pushed forwardly by the material inside the open cells 150A-150C.

As mentioned above, the front faces 112A-112C are arranged end-to-end. In the example illustrated, the first end 120 of the front face 112A is positioned at the first end 108 of the bulkhead 102, and the second end 122 of the front face 112C is positioned at the second end 109 of the bulkhead 102. Therefore, in this example, neither the first end 120 of the front face 112A nor the second end 122 of the front face 112C is adjacent to another one of the front faces 112A-112C. The first end 120 of the front face 112A is anchored to the land 104 by the tail wall 140A (and optionally, the tail wall 130A). The second end 122 of the front face 112C is anchored to the land 104 by the tail wall 140D (and optionally, the tail wall 130H). Alternatively, in the bulkhead 500 illustrated in FIG. 10, the first end 120 of the front face 112A and the second end 122 of the front face 112C are coupled to front faces 112D and 112E, respectively (that are anchored to the land 104 by the tail walls 130B and 130G, respectively).

A junction is defined at locations where adjacent front faces 112A-112C are connected together. For example, referring to FIG. 2, the second end 122 of the front face 112A is connected to the first end 120 of the front face 112b at a first junction 160A, and the second end 122 of the front face 112b is connected to the first end 120 of the front face 112C at a second junction 160B.

As mentioned above, as originally constructed, the bulkhead 102 includes the curved front faces 112A-112C and the tail walls 140A-140D. In such embodiments, each of the junctions 160A and 160B is connected to the first end 142 of a different one of the tail walls 140B and 140C. For example, the first junction 160A may be connected to the first end 142 of the tail wall 140B, and the second junction 160B may be connected to the first end 142 of the tail wall 140C. In such embodiments, the first end 120 of the front face 112A is anchored to the land 104 by the tail wall 140A and the second end 122 of the front face 112C is anchored to the land 104 by the tail walls 140D. If after construction, the curved front face 112A is damaged, one or more of the curved tail walls 130A-130D may be added to the bulkhead 102. Similarly, if the curved front face 112B is damaged, one or more of the curved tail walls 130C-130F may be added to the bulkhead 102. Additionally, if the curved front face 112C is damaged, one or more of the curved tail walls 130E-130H may be added to the bulkhead 102.

Alternatively, referring to FIG. 10, as originally constructed, the bulkhead 500 includes the curved front faces 112A-112C and the curved tail walls 130A-130H. In such embodiments, each of the junctions 160A and 160B is connected to the first ends 132 of a different pair of the tail walls 130C-130F. For example, the first junction 160A is connected to the first ends 132 of the tail walls 130C and 130D, and the second junction 160B is connected to the first ends 132 of the tail walls 130E and 130F. The curved tail walls connected to each of the junctions 160A and 160B extend outwardly therefrom in different directions and balance the load (or forces) at the junction. Thus, in the example illustrated, the curved tail walls 130C and 130D extend outwardly from the first junction 160A in different directions, and the curved tail walls 130E and 130F extend outwardly from the second junction 160B in different directions. At its first end 132, the curved tail wall 130C may extend along an arc defined by the first end 120 of the front face 112B. Similarly, at its first end 132, the curved tail wall 130D may extend along an arc defined by the second end 122 of the front face 112A. The first end 120 of the front face 112A is anchored to the land 104 by the tail wall 130A and the second end 122 of the front face 112C is anchored to the land 104 by the tail wall 130H. The curved tail wall 130B may be omitted if the front face 112D is omitted, and the curved tail wall 130G may be omitted if the front face 112E is omitted. If after construction, the curved front face 112A is damaged, repairs to the bulkhead 500 are not required or may be made, if desired, more easily. Similarly, if the curved front face 112B is damaged, repairs to the bulkhead 500 are not required or may be made, if desired, more easily. Additionally, if the curved front face 112C is damaged, repairs to the bulkhead 500 are not required or may be made, if desired, more easily.

By way of yet another non-limiting example, referring to FIG. 2, the system 100 may be used to construct a bulkhead that includes the curved front faces 112A-112C, the curved tail walls 130A-130H, and the tail walls 140A-140D. By way of yet another non-limiting example, as originally constructed, the system 100 may include the curved front faces 112A-112C, a portion of the curved tail walls 130A-130H, and a portion of the tail walls 140A-140D. For example, as originally constructed, the junction 160A may be connected only to the curved tail walls 130C and 130D and the junction 160B may be connected only to the tail wall 140C.

Figure 3:
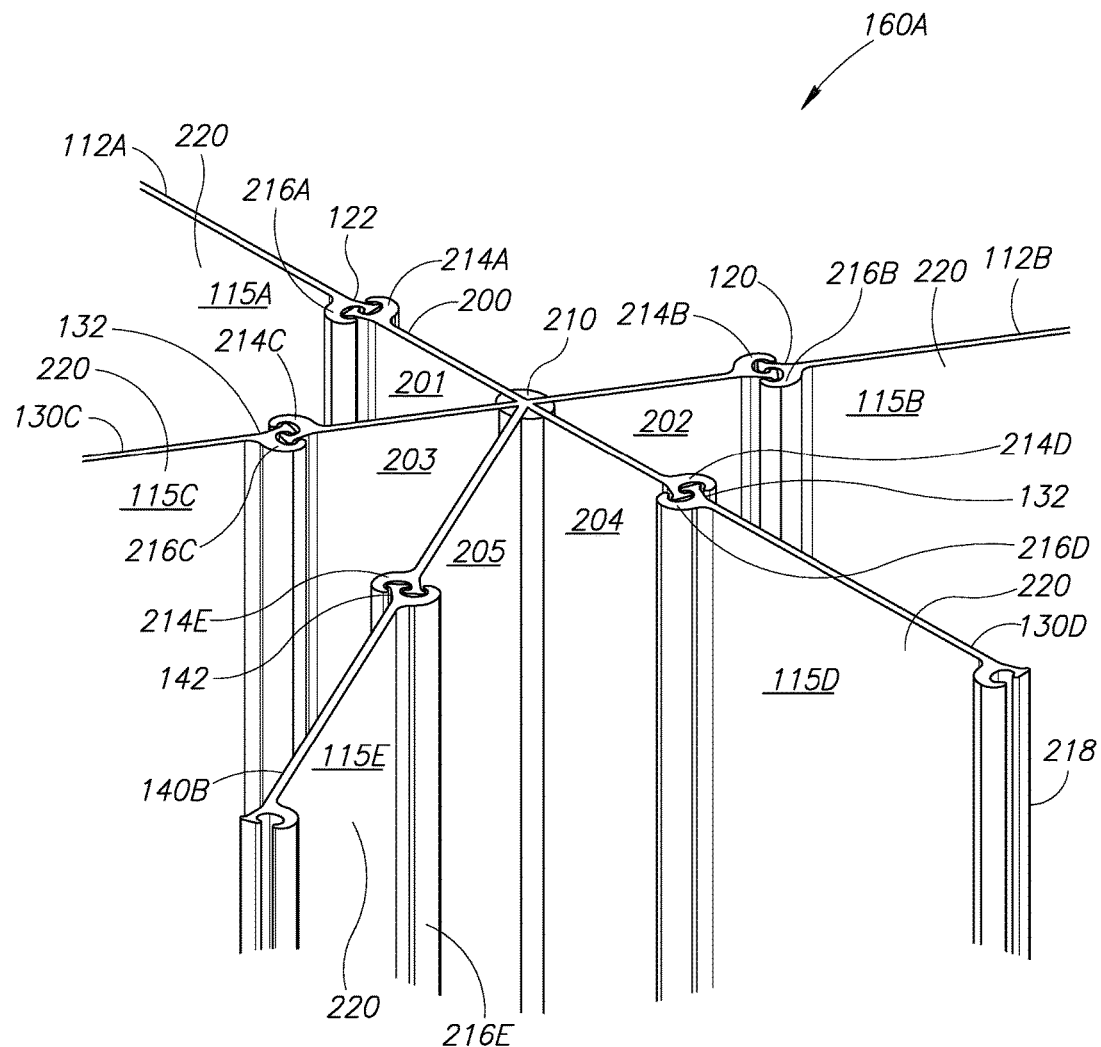
FIG. 3 is a perspective view of a first exemplary implementation of a junction (that includes an X-Wye connector) of the bulkhead of FIG. 2.

FIG. 3 is perspective view of an exemplary implementation of the first junction 160A. In FIG. 3, the first junction 160A (which connects the front faces 112A and 112B together) is depicted as being connected to the tail wall 140B and the curved tail walls 130C and 130D. However, as explained above, as originally constructed, the first junction 160A may be connected to only the tail wall 140B or the only the curved tail walls 130C and 130D. Referring to FIG. 3, at the first junction 160A, together the front face 112A and the curved tail wall 130D (when present) form a first curved line of an X-like shape that crosses a second curved line (of the X-like shape) defined by the front face 112B and the curved tail wall 130C (when present). Similarly, referring to FIG. 2, at the second junction 160B, together the front face 112B and the curved tail wall 130F (when present) form a first curved line of an X-like shape that crosses a second curved line (of the X-like shape) defined by the front face 112C and the curved tail wall 130E (when present).

When the tail wall 140B is present, a Y-like shape is also defined at the first junction 160A by the front faces 112A and 112B and the tail wall 140B. Similarly, referring to FIG. 2, a Y-like shape may be defined at the second junction 160B by the front faces 112B and 112C and the tail wall 140C. In such embodiments, the connections formed at each of the junctions 160A and 160B may be characterized as having an XY or X-wye shape.

The X-like shape formed at each of the junctions 160A and 160B provides additional (and/or redundant) counter-balancing for the load applied to the front faces 112A-112C. For example, referring to FIG. 10, at each of the junctions 160A and 160B, a pair of the curved tail walls 130C-130F together counteract at least a portion of the forwardly directed force applied to those of the front faces 112A-112C also connected at the junction. If the front face 112B ruptures or is damaged, at least some of the tension in the front face 112B is released. This means the front face 112B may no longer be balancing the longitudinal force components applied to the junctions 160A and 160B by the front faces 112A and 112C. However, the curved tail walls 130D and 130E are configured to at least partially counteract and balance longitudinal components supplied by the front faces 112A and 112C, respectively. Thus, in the event of a rupture, the bulkhead 500 is more balanced and redundant than the system 10 (see FIG. 1), which makes repairing the bulkhead 500 easier. Further, even if damaged, the bulkhead 500 may remain balanced, which further reduces or eliminates the amount of work required to repair the bulkhead 500.

The bulkhead 500 constructed by the system 100 (see FIG. 2) may be characterized as being an intrinsically redundant open cellular bulkhead that includes two (or three) tail walls at each of the junctions 160A and 160B where adjacent ones of the front faces 112A-112C are connected together. This structure allows each of the open cells 150A-150C within the bulkhead 500 to act as a self-supporting unit that is not dependent on adjacent cells to balance forces developed within the open cell itself.

Figure 4:
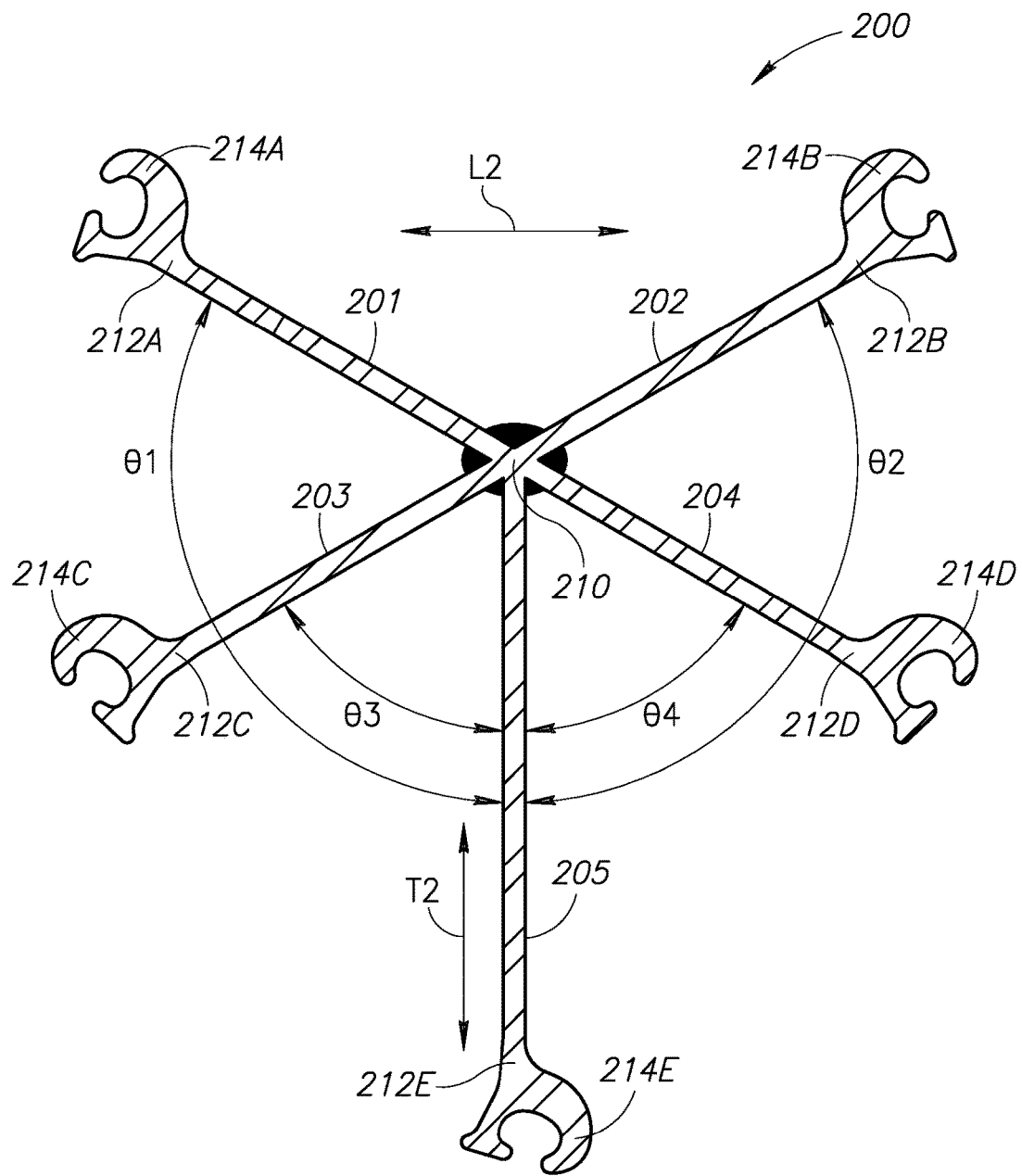
FIG. 4 is a top view of a first embodiment of an X-Wye connector that may be used to connect a front face of a bulkhead to one or more tail walls of the bulkhead.

FIG. 4 is a top view of a first embodiment of a connector 200 that may be used to connect the first and second ends 120 and 122 (see FIGS. 2 and 10) of each of the front faces 112A-112C (see FIG. 2) to one or more of the tail walls 114 (see FIGS. 2 and 10). For example, the connector 200 may be used to implement one of the junctions 160A and 160B (see FIGS. 2 and 10). By way of another example, the connector 200 may be used to implement the first and second ends 108 and 109 (see FIG. 2) of the bulkhead 102 (see FIG. 2).

Referring to FIG. 4, the connector 200 has a plurality of arms 201-205 that extend radially outwardly from a central portion 210. Optionally, the arm 205 may be omitted. The arms 201-205 have free end portions 212A-212E, respectively, with edge connectors 214A-214E, respectively, formed therein. Referring to FIG. 3, the edge connectors 214A-214E are configured to be coupled to corresponding edge connectors 216A-216E, respectively, extending along a vertically oriented edge of the flat web sheet pile sections 115A-115E, respectively.

The edge connectors 214A-214E may be implemented using any connectors configured to mate with the edge connectors 216A-216E. In the embodiment illustrated, the edge connectors 214A-214E are substantially identical to the edge connectors 216A-216E. Further, the edge connectors 214A-214E are substantially identical to one another, and the edge connectors 216A-216E are substantially identical to one another.

As is apparent to those of ordinary skill in the art, the sheet pile sections 115A-115E may be substantially identical to one another. Therefore, for the sake of brevity, only the sheet pile section 115D will be described in detail. As mentioned above, the sheet pile section 115D has the edge connector 216D, which is opposite another sheet pile connector 218 that may be substantially identical to the edge connector 216D. The edge connectors 216D and 218 are connected together by a flat web 220.

Referring to FIG. 4, for the purposes of illustration, at the connector 200, force components extending in directions (identified by a double headed arrow "T2") substantially parallel with the arm 205 will be referred to as being transverse components, and force components extending in directions (identified by a double headed arrow "L2") substantially orthogonal with the transverse components will be referred to as being longitudinal components.

The arm 201 is collinear with the arm 204, and the arm 202 is collinear with the arm 203. Together the arms 201 and 204 form a first line of an X-like shape that crosses a second line formed by the arms 202 and 203. The first and second lines cross at or near the central portion 210. A first inside angle 81 is defined between the arm 201 and the arm 205, and a second inside angle 82 is defined between the arm 202 and the arm 205. The first and second inside angles 81 and 82 are substantially identical. A third inside angle 83 is defined between the arm 203 and the arm 205, and a fourth inside angle 84 is defined between the arm 204 and the arm 205. The third and fourth inside angles 83 and 84 are substantially identical. Further, an inside angle defined between the arms 201 and 203 is substantially identical to an inside angle defined between the arms 202 and 204, and an inside angle defined between the arms 201 and 202 is substantially identical to an inside angle defined between the arms 203 and 204.

When the arm 205 is present, the arm 205 extends outwardly from the central portion 210 between the arms 203 and 204. Together the arms 201, 202, and 205 define a Y-shape. Thus, when the arm 205 is present, the connector 200 may be characterized as being an XY or X-wye connector. On the other hand, when the arm 205 is omitted, the connector 200 may be characterized as being an X-shaped or X connector.

As mentioned above, the connector 200 may be used to implement one of the junctions 160A and 160B (see FIG. 2). The junctions 160A and 160B are substantially identical to one another. Therefore, for the sake of brevity, the connector 200 will be described as implementing the first junction 160A.

Referring to FIG. 3, the second end 122 of the front face 112A may be implemented using the sheet pile section 115A, which has the edge connector 216A positioned along one of its upright edges. The edge connector 214A is configured to interlock with the edge connector 216A. Across the interlocked edge connectors 214A and 216A, the arm 201 may be aligned or collinear with the flat web 220 of the sheet pile section 115A. Alternatively, the interlocking may laterally offset the arm 201 from the flat web 220 of the sheet pile section 115A. By way of another non-limiting example, the flat web 220 of the sheet pile section 115A may be positioned at an angle with respect to the arm 201.

The first end 132 of the curved tail wall 130D may be implemented using the sheet pile section 115D, which has the edge connector 216D positioned along one of its upright edges. The edge connector 214D is configured to interlock with the edge connector 216D. Across the interlocked edge connectors 214D and 216D, the arm 204 may be aligned or collinear with the flat web 220 of the sheet pile section 115D. Alternatively, the interlocking may laterally offset the arm 204 from the flat web 220 of the sheet pile section 115D. By way of another non-limiting example, the flat web 220 of the sheet pile section 115D may be positioned at an angle with respect to the arm 204.

The first end 120 of the front face 112B may be implemented using the sheet pile section 115B, which has the edge connector 216B positioned along one of its upright edges.

The edge connector 214B is configured to interlock with the edge connector 216B. Across the interlocked edge connectors 214B and 216B, the arm 202 may be aligned or collinear with the flat web 220 of the sheet pile section 115B. Alternatively, the interlocking may laterally offset the arm 202 from the flat web 220 of the sheet pile section 115B. By way of another non-limiting example, the flat web 220 of the sheet pile section 115B may be positioned at an angle with respect to the arm 202.

The first end 132 of the curved tail wall 130C may be implemented using the sheet pile section 115C, which has the edge connector 216C positioned along one of its upright edges. The edge connector 214C is configured to interlock with the edge connector 216C. Across the interlocked edge connectors 214C and 216C, the arm 203 may be aligned or collinear with the flat web 220 of the sheet pile section 115C. Alternatively, the interlocking may laterally offset the arm 203 from the flat web 220 of the sheet pile section 115C. By way of another non-limiting example, the flat web 220 of the sheet pile section 115C may be positioned at an angle with respect to the arm 203.

When present, the first end 142 of the tail wall 140B may be implemented using the sheet pile section 115E, which has the edge connector 216E positioned along one of its upright edges. The edge connector 214E is configured to interlock with the edge connector 216E. Across the interlocked edge connectors 214E and 216E, the arm 205 may be aligned or collinear with the flat web 220 of the sheet pile section 115E. Alternatively, the interlocking may laterally offset the arm 205 from the flat web 220 of the sheet pile section 115E. By way of another non-limiting example, the flat web 220 of the sheet pile section 115E may be positioned at an angle with respect to the arm 205.

The connector 200 may be constructed by cutting the flat web of each of a pair of sheet pile sections (e.g., like the sheet pile sections 115A-115E) lengthwise to obtain four partial sheet sections each having an edge connector opposite a cut edge. Then, the cut edges of three of the partial sheet sections may be welded to a third (complete) sheet pile section with their edge connectors facing outwardly. By way of another non-limiting example, five partial sheet sections may be welded together to form the connector 200. The connector 200 is not limited to being constructed by any particular method and may be constructed using methods other than those presented herein.

Figure 5:
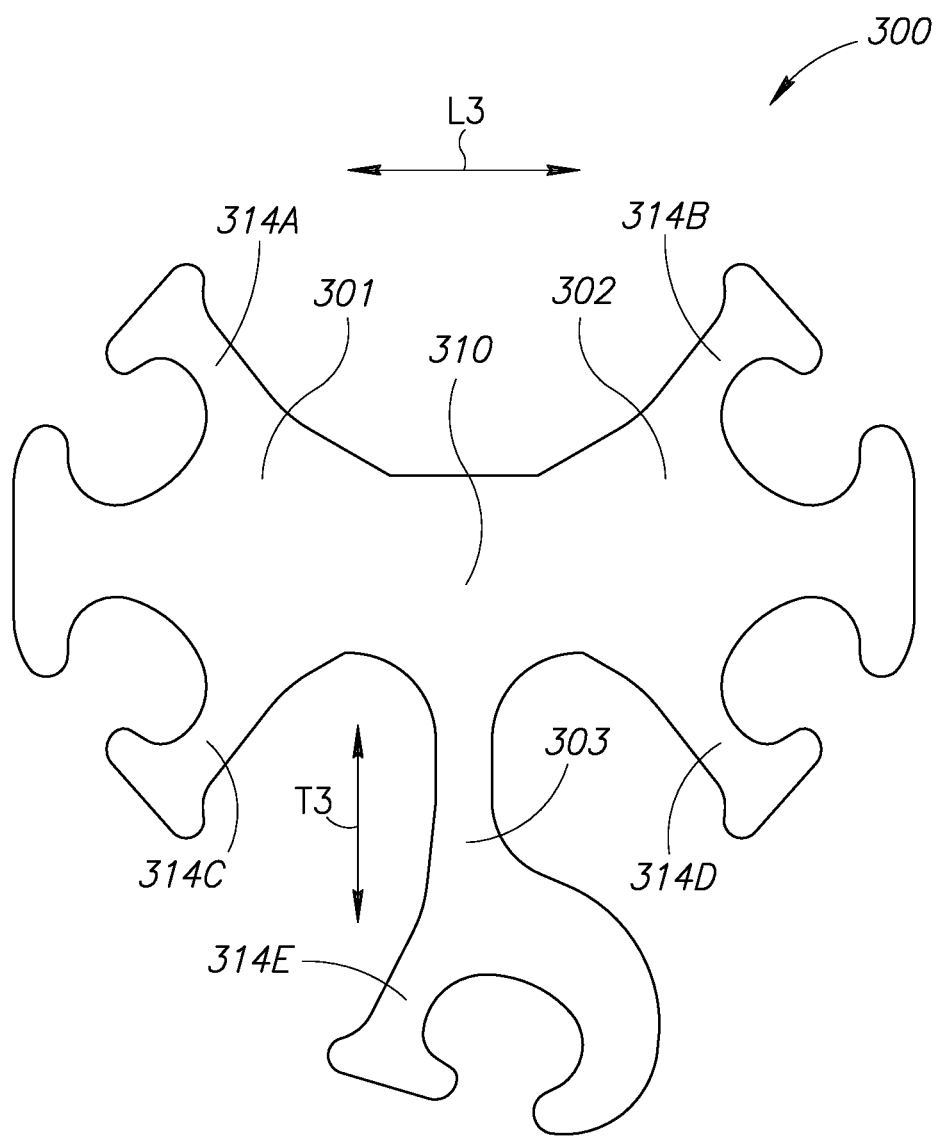
FIG. 5 is a top view of a second embodiment of an X-Wye connector that may be used to connect a front face of a bulkhead to one or more tails walls of the bulkhead.

FIG. 5 is a top view of a second embodiment of a connector 300 that may be used to connect the first and second ends 120 and 122 (see FIG. 2) of each of the front faces 112A-112C (see FIG. 2) to one or more of the tail walls 114 (see FIG. 2). For example, the connector 300 may be used to implement one of the junctions 160A and 160B (see FIGS. 2 and 10). By way of another example, the connector 300 may be used to implement the first and second ends 108 and 109 (see FIG. 2) of the bulkhead 102 (see FIG. 2). The connector 300 may be formed by an extrusion or welding process.

Figure 6:
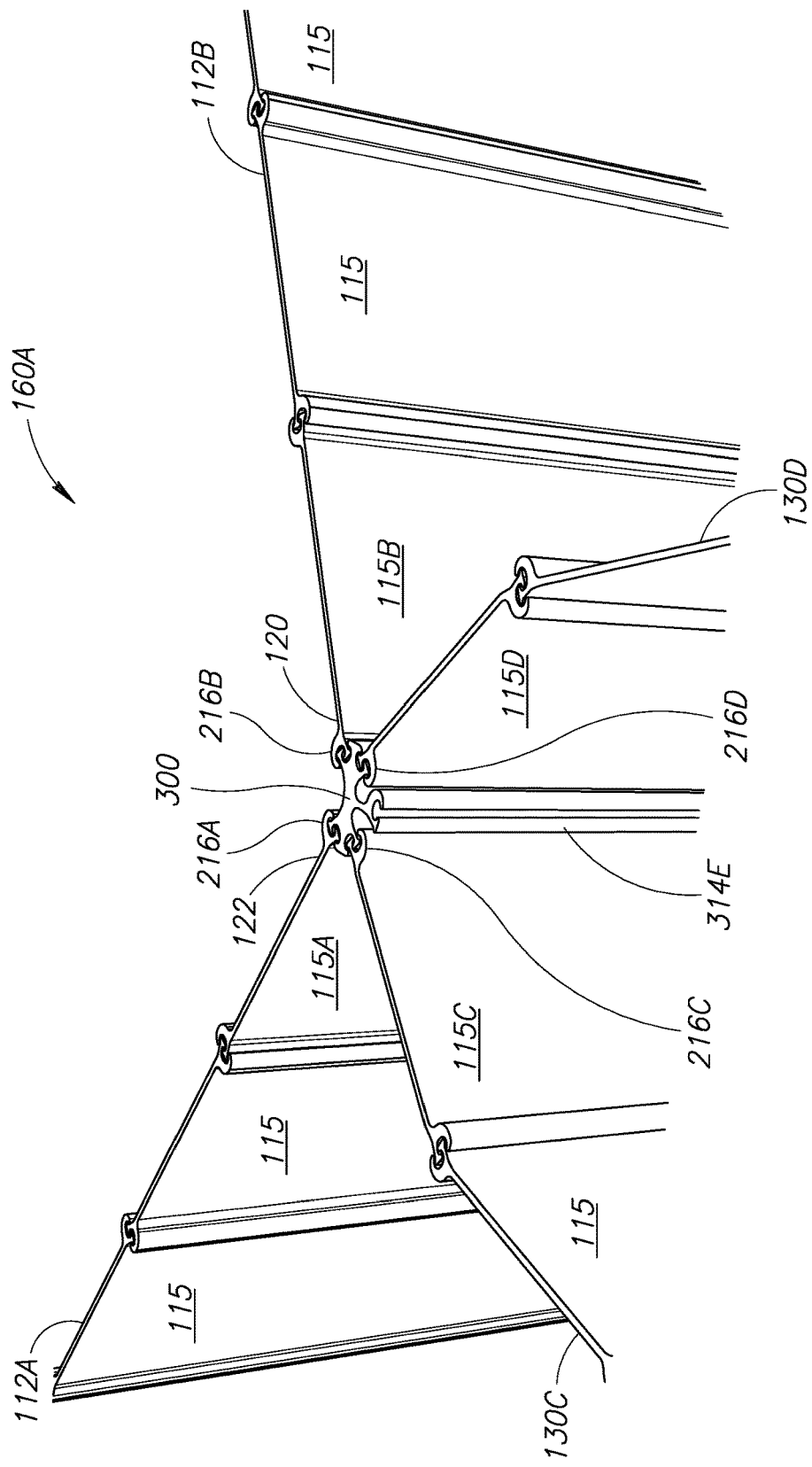
FIG. 6 is a perspective view of a second exemplary implementation of the junction of the bulkhead of FIG. 2 using the connector of FIG. 5.

Referring to FIG. 5, the connector 300 has a plurality of arms 301-303 that extend radially outwardly from a central portion 310. Optionally, the arm 303 may be omitted. The arm 301 terminates with a pair of edge connectors 314A and 314C. The edge connectors 314A and 314C are positioned back-to-back and formed as a single unit. Similarly, the arm 302 terminates with a pair of edge connectors 314B and 314D that are positioned back-to-back and formed as a single unit. Referring to FIG. 6, the edge connectors 314A-314D (see FIG. 5) are configured to be coupled to the edge connectors 216A-216D, respectively, of the sheet pile sections 115A-115D, respectively. Referring to FIG. 5, the arm 303 terminates with an edge connector 314E configured to be coupled to the edge connector 216E (see FIG. 3) of the sheet pile section 115E (see FIG. 3). The edge connectors 314A-314E may be implemented using any connectors configured to mate with the edge connectors 216A-216E (see FIG. 6).

Referring to FIG. 5, for the purposes of illustration, at the connector 300, force components extending in directions (identified by a double headed arrow "T3") substantially parallel with the arm 303 will be referred to as being transverse components, and force components extending in directions (identified by a double headed arrow "L3") substantially orthogonal with the transverse components will be referred to as being longitudinal components.

The arm 301 is collinear with the arm 302. The arms 301 and 302 extend outwardly from the central portion 310 in opposite directions. A first line of an X-like shape extends through the edge connectors 314A and 314D. The first line crosses a second line that extends through the edge connectors 314B and 314C. The first and second lines cross at or near the central portion 310.

When present, the arm 303 is substantially orthogonal to the collinear arms 301 and 302. Together the edge connector 314A, the edge connector 314B, and the arm 303 define a Y-shape. Thus, when the arm 303 is present, the connector 300 may be characterized as being an XY or X-wye connector. On the other hand, when the arm 303 is omitted, the connector 300 may be characterized as being an X-shaped or X connector.

As mentioned above, the connector 300 may be used to implement one of the junctions 160A and 160B (see FIGS. 2 and 10). The junctions 160A and 160B are substantially identical to one another. Therefore, for the sake of brevity, the connector 300 will be described as implementing the first junction 160A.

Referring to FIG. 6, the edge connectors 314A-314E (see FIG. 5) are configured to interlock with the edge connectors 216A-216E, respectively. These interlocking connections may be substantially identical to the interlocking connections formed between the edge connectors 214A-214E (see FIG. 3) and the edge connectors 216A-216E, respectively.

Referring to FIGS. 3-6, the connectors 200 and 300 each have four and optionally five sheet pile connection points. Specifically, referring to FIG. 4, the connector 200 includes the edge connectors 214A-214D and, optionally, the edge connector 214E. Similarly, referring to FIG. 5, the connector 300 includes the edge connectors 314A-314D and, optionally, the edge connector 314E.

Figure 7:
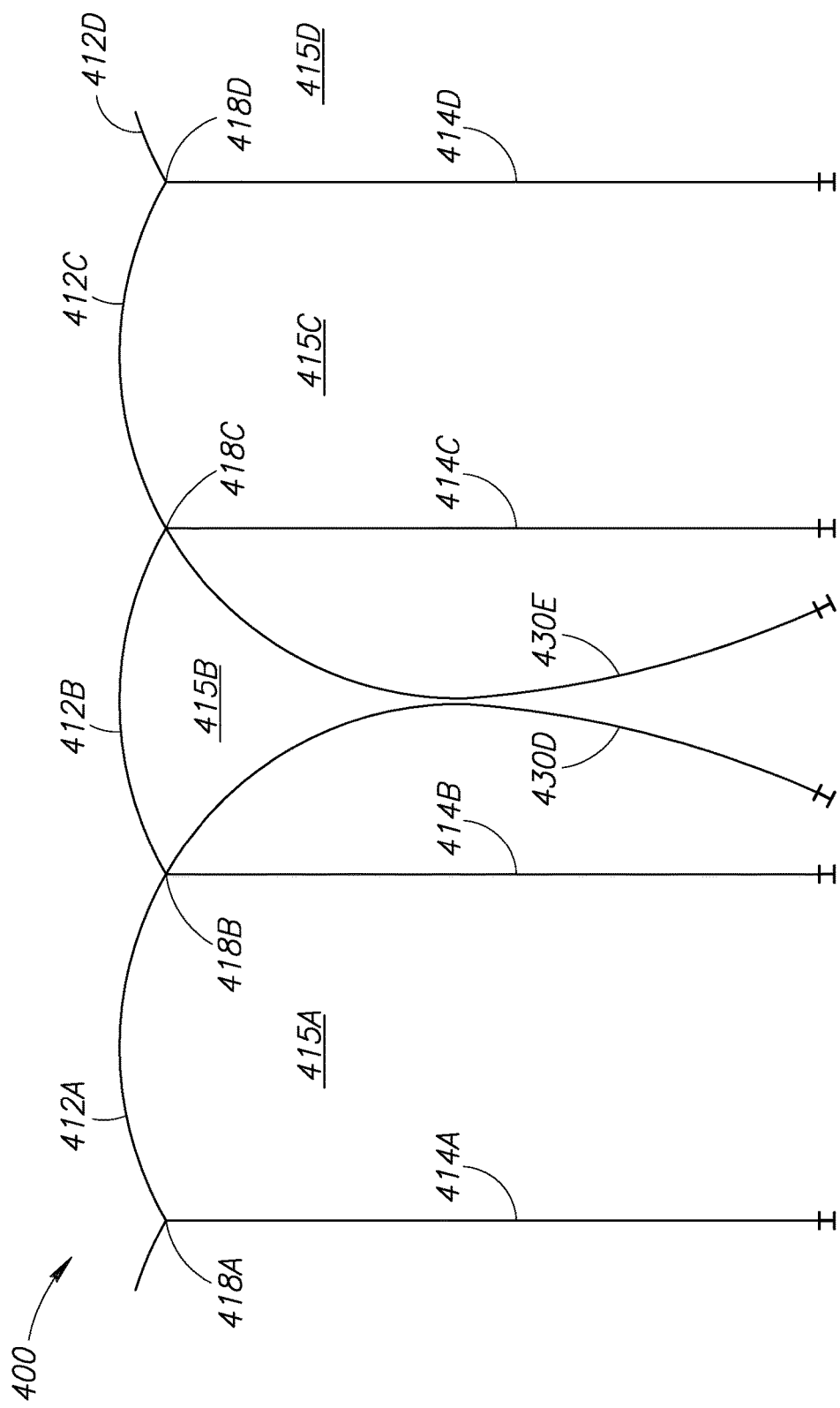
FIG. 7 is a top view of a bulkhead that was repaired using a method illustrated in FIG. 9 after one of the front faces of the bulkhead was damaged.
Figure 8:
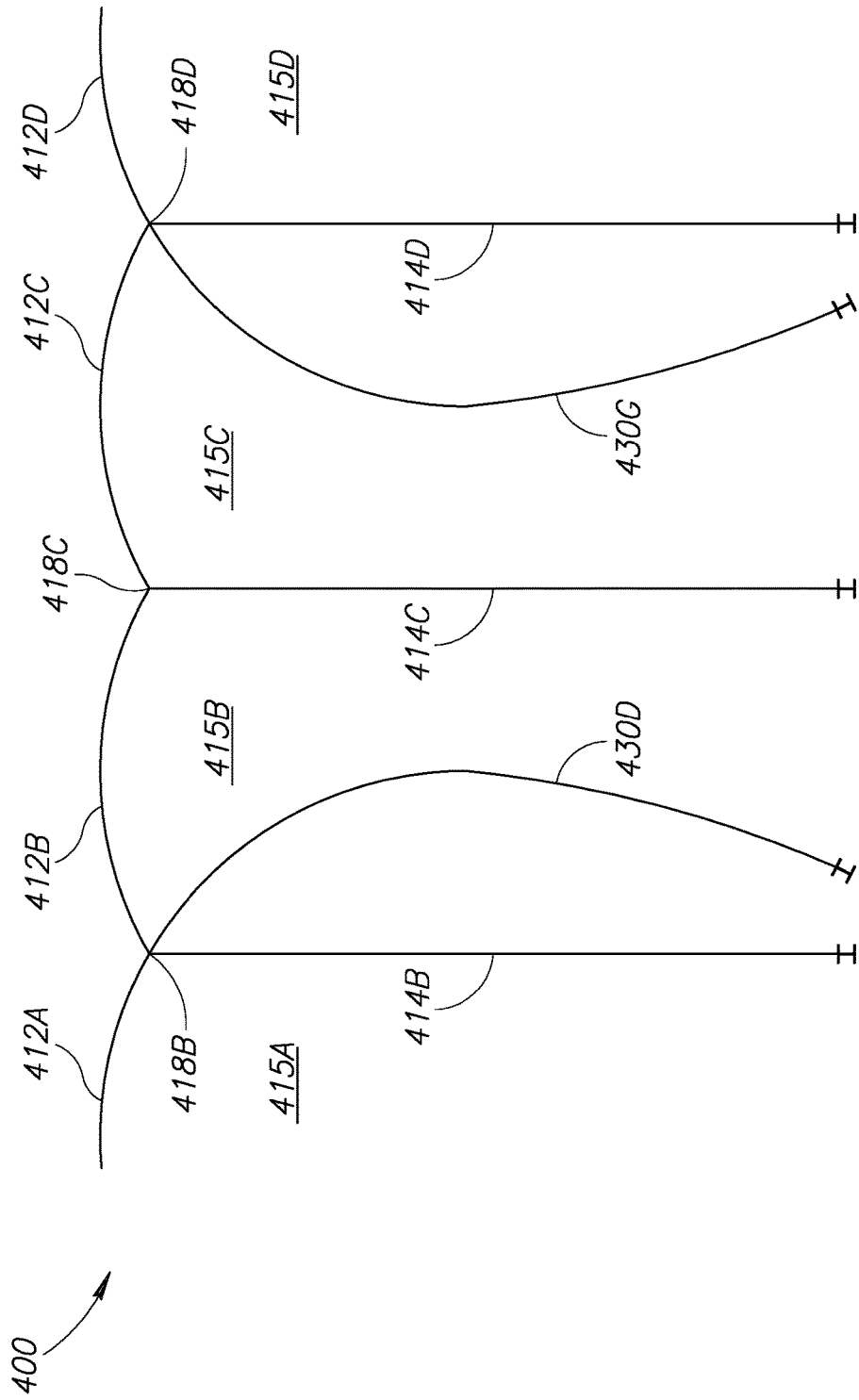
FIG. 8 is a top view of a bulkhead that was repaired using the method illustrated in FIG. 9 after a section of the bulkhead that included more than one of its front faces and/or one or more of its X-wye connectors was damaged.
Figure 9:
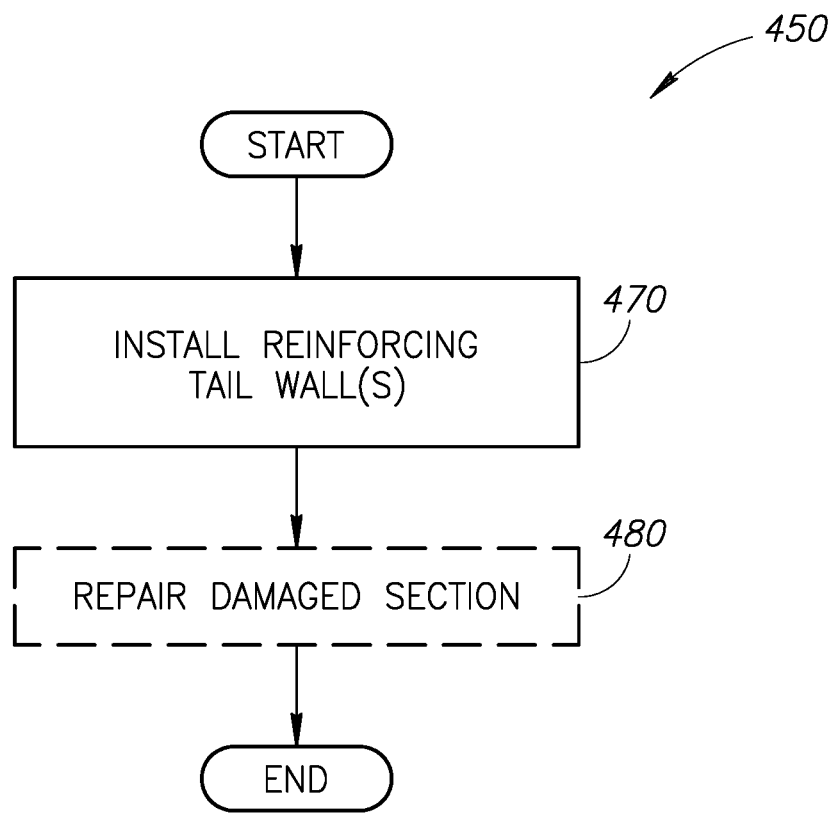
FIG. 9 is a flow diagram of the method of repairing a damaged section of a bulkhead.

FIG. 9 is a flow diagram of a method 450 of repairing damage to a section of a bulkhead (e.g., a bulkhead 400 illustrated in FIGS. 7 and 8). Referring to FIGS. 7 and 8, the bulkhead 400 includes a plurality of front faces (e.g., front faces 412A-412D) that are each substantially identical to one of the front faces 112A-112C (see FIG. 2) of the bulkhead 102 (see FIG. 2). The bulkhead 400 also includes a plurality of tail walls (e.g., tail walls 414A-414D) that are each substantially identical to one of the tail walls 140A-140D (see FIG. 2) of the bulkhead 102 (see FIG. 2). The tail wall 414A (see FIG. 7) is connected to the front face 412A by an X-wye connector 418A (e.g., one of the connectors 200 or 300 illustrated in the FIGS. 4 and 5, respectively). Similarly, the front faces 412A and 412B are both connected to the shared tail wall 414B by an X-wye connector 418B, the front faces 412B and 412C are both connected to the shared tail wall 414C by an X-wye connector 418C, and the front faces 412C and 412D are both connected to the shared tail wall 414D by an X-wye connector 418D. Before the repair, the front faces 412A-412D and the tail walls 414A-414D define open cells 415A-415D that are each substantially identical to one of the open cell structures 150A-150C (see FIG. 2) of the bulkhead 102 (see FIG. 2).

In a first example illustrated in FIG. 7, the damaged section includes only the front face 412B of the single open cell 415B. As explained above, after the front face 412B has been damaged, the front face 412B is no longer able to balance longitudinal force components received from the adjacent undamaged open cells 415A and 415C (via the front faces 412A and 412C, respectively). In a second example illustrated in FIG. 8, the damaged section includes the front faces and/or X-wye connectors of multiple adjacent open cells. For illustrative purposes, the damaged section will be described as having included both of the front faces 412B and 412C and/or the X-wye connector 418C positioned between the front faces 412B and 412C. Thus, in this example, the adjacent open cells 415B and 415C were damaged and were no longer able to balance longitudinal force components received (via the front faces 412A and 412D) from the adjacent undamaged open cells 415A and 415D.

Referring to FIG. 9, in first block 470, at least one redundant or reinforcing tail wall is installed and connected to at least one of the X-wye connectors 418A-418D of the bulkhead 400. The reinforcing tail walls are used to balance forces received from undamaged open cells adjacent to the damaged section. For example, referring to FIG. 7, a curved reinforcing tail wall 430D was installed and connected to the X-wye connector 418B, and a curved reinforcing tail wall 430E was installed and connected to the X-wye connector 418C. The reinforcing tail walls 430D and 430E are configured to balance the force components received from the front faces 412A and 412C, respectively. In FIG. 7, the reinforcing tail walls 430D and 430E are oriented in line with the front faces 412A and 412C, respectively, allowing direct transfer of load from the front faces 412A and 412C to the reinforcing tail walls 430D and 430E, respectively. Thus, the reinforcing tail walls 430D and 430E help support the adjacent open cells 415A and 415C. The reinforcing tail walls 430D and 430E may be substantially identical to the curved tail walls 130D and 130E (see FIGS. 2 and 10), respectively.

Referring to FIG. 8, the curved reinforcing tail wall 430D was installed and connected to the X-wye connector 418B, and a curved reinforcing tail wall 430G was installed and connected to the X-wye connector 418D. The reinforcing tail walls 430D and 430G are configured to balance the force components received from the front faces 412A and 412D, respectively. The reinforcing tail walls 430D and 430G are oriented in line with the front faces 412A and 412D, respectively, allowing direct transfer of load from the front faces 412A and 412D to the reinforcing tail walls 430D and 430G, respectively. Thus, the reinforcing tail walls 430D and 430G support the adjacent open cells 415A and 415D. The reinforcing tail walls 430D and 430G may be substantially identical to the curved tail walls 130D and 130G (see FIGS. 2 and 10), respectively.

Referring to FIG. 9, in optional block 480, the damaged section is repaired or replaced. For example, referring to FIG. 7, the front face 412B may be repaired and/or replaced. In embodiments in which block 480 is omitted, the front face 412B may be left in service. By way of another non-limiting example, referring to FIG. 8, the front faces 412B and 412C and/or the X-wye connector 418C may be repaired and/or replaced. In embodiments in which block 480 of FIG. 9 is omitted, the front faces 412B and 412C and/or the X-wye connector 418C may be left in service.

Conventionally, repairing the damaged section(s) could be complex and expensive. By utilizing the X-wye connectors and installing the reinforcing tail walls in block 470, substantially less work is required to repair the bulkhead 400.

Referring to FIG. 9, the reinforcing tail walls installed in block 470 (e.g., the tail walls 430D and 430E illustrated in FIG. 7, or the tail walls 430D and 30G illustrated in FIG. 8) are left in place permanently (e.g., because they resolve the loads developed at the front faces (e.g., the front faces 412A-412D illustrated in FIGS. 7 and 8).

Then, the method 450 terminates.

The method 450 may also be used to repair a bulkhead configured differently than the bulkhead 400 illustrated in FIGS. 7 and 8.

In the example illustrated in FIG. 10, a damaged section may include only the front face 112B of the single open cell 150B. As explained above, the open cells 150A-150C may be configured to be self-supporting. Therefore, when the front face 112B of the open cell 150B is damaged, the other open cells 150A and 150C may not need additional support. Thus, the bulkhead 500 need not be repaired or only the open cell 150B may be repaired, if desired. Alternatively, the damage may be extensive enough that additional support is needed. For example, at least one tail wall (e.g., one of the tail walls 140B and 140C depicted in FIG. 2) may be installed and connected to at least one junctions (e.g., one of the junctions 160A-160B) of the bulkhead 500. For example, the tail wall 140B (see FIG. 2) may be installed and connected to the X-wye connector at the first junction 160A, and the tail wall 140C (see FIG. 2) may be installed and connected to the X-wye connector at the second junction 160B.

As is apparent to those of ordinary skill in the art, additional tail walls may be installed anywhere within the bulkheads 102 (see FIG. 2) and 500 (see FIG. 10) and used to provide support. Further, in bulkheads (like the bulkhead 2 illustrated in FIG. 1) that do not include X-wye connectors (e.g., the connector 200 illustrated in the FIGS. 3 and 4, or the connector 300 illustrated in the FIGS. 5 and 6), one or more X-wye connectors may be installed and used to connect at least one redundant or reinforcing tail wall to the bulkhead. For example, if the bulkhead 2 is damaged, the connector YAB and/or the connector YBC may be replaced with an X-wye connector. Then, in block 470 (see FIG. 9), at least one redundant or reinforcing tail wall may be installed and connected to each of the replacement X-wye connectors. These reinforcing tail walls may be left in place permanently. In optional block 480 (see FIG. 9), the damaged section may be repaired or replaced. Alternatively, the damaged section may be left in service.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
   first and second curved front faces, the first curved front face having a first load applied thereto by material that presses against the first curved front face, the first curved front face having a first end portion extending along a first arc opposite a second end portion extending along a second arc, the first load being dividable into first and second portions;
   first, second, third, and fourth tail walls each having a first end opposite a second free end, the first, second, and third tail walls being curved, each of the first and second curved front faces, and each of the first, second, third, and fourth tail walls comprising a plurality of sheet pile sections arranged edge-to-edge and coupled together in a series;
   a first connector configured to couple the first end portion of the first curved front face to the first end of the first tail wall;
   a second connector configured to couple the second curved front face to the first end of the fourth tail wall; and a third connector configured to couple the second end portion of the first curved front face to the first end of the third tail wall, and to couple the second curved front face to the first end of the second tail wall with the second tail wall being positioned between the first and third tail walls, the third tail wall being positioned between the second and fourth tail walls, a first opening being defined between the second free ends of the first and third tail walls, and a second opening being defined between the second free ends of the second and fourth tail walls, the first end of the first tail wall extending along the first arc and receiving the first portion of the first load, the first end of the third tail wall extending along the second arc and receiving the second portion of the first load, the first and third tail walls receiving and balancing the entire first load applied to the first curved front face, the second curved front face and the second and fourth tail walls not being needed to balance the first load applied to the first curved front face.

2. The system of claim 1, wherein the second curved front face has a second load applied thereto,
   the second load is dividable into first and second portions,
   the second curved front face has a first end portion extending along a third are opposite a second end portion extending along a fourth arc,
   the third connector is configured to couple the first end portion of the second curved front face to the first end of the second tail wall,
   the second connector is configured to couple the second end portion of the second curved front face to the first end of the fourth tail wall,
   the fourth tail wall is curved,
   the first end of the second tail wall extends along the third arc and receives the first portion of the second load,
   the first end of the fourth tail wall extends along the fourth arc and receives the second portion of the second load,
   the second and fourth tail walls receive and balance the entire second load applied to the second curved front face, and
   the first curved front face and the first and third tail walls are not needed to balance the second load applied to the second curved front face.

3. The system of claim 1, wherein the fourth tail wall is curved.

4. The system of claim 1, wherein the third connector is an X-wye connector.

5. The system of claim 1, wherein at least one of the first and second connectors is an X-wye connector.

6. The system of claim 1, further comprising:
   a fifth tail wall connected to the third connector, the fifth tail wall extending between the second and third tail walls, the fifth tail wall comprising sheet pile sections arranged edge-to-edge and coupled together in a series.

7. The system of claim 1, further comprising:
   a fifth tail wall connected to the first connector, the fifth tail wall extending between the first and second tail walls, the fifth tail wall comprising sheet pile sections arranged edge-to-edge and coupled together in a series.

8. A system comprising:
   A plurality of front faces each comprising a first plurality of sheet pile sections arranged end-to-end in a series, each of the plurality of front faces being configured to have a load applied thereto by material that presses against the front face;
   A plurality of X-wye connectors configured to connect together adjacent ends of adjacent ones of the plurality of front faces; and A plurality of substantially linear tail walls each configured to be connected to a different one of the plurality of X-wye connectors, each of the plurality of substantially linear tail walls comprising a second plurality of sheet pile sections arranged end-to-end in a series, each of the plurality of X-wye connectors being connectable to a different pair of curved tail walls in addition to one of the plurality of substantially linear tail walls and the adjacent ends of the adjacent front faces, the load applied to each of the plurality of front faces being transferable by first and second ones of the plurality of X-wye connectors to first and second curved tail walls, respectively, that are connected to the first and second X-wye connectors, respectively, the first and second curved tail walls each comprising a third plurality of sheet pile sections arranged end-to-end in a series.

9. A sheet pile bulkhead comprising:
a plurality of open cells comprising first and second open cells, the plurality of open cells each comprising a curved front face, a first tail wall, and a second tail wall, the curved front face, the first tail wall, and the second tail wall each comprising a plurality of sheet pile sections arranged edge-to-edge and coupled together in a series, the curved front face having first and second end portions, the first tail wall comprising a first free end opposite a first tethered end, the second tail wall comprising a second free end opposite a second tethered end, the second free end being spaced apart from the first free end to define an opening therebetween, the curved front face of the first open cell being configured to have a first load applied thereto by material that presses against the curved front face of the first open cell, the first load being dividable into first and second portions;
a first connector coupling the first tethered end of the first tail wall of the first open cell to the first end portion of the curved front face of the first open cell, the first end portion of the curved front face of the first open cell having a first arc, the first tethered end of the first tail wall of the first open cell extending along the first arc and receiving the first portion of the first load;
a second connector coupling the second tethered end of the second tail wall of the second open cell to the second end portion of the curved front face of the second open cell; and
a third connector coupling the second tethered end of the second tail wall of the first open cell to the second end portion of the curved front face of the first open cell, the third connector also coupling the first tethered end of the first tail wall of the second open cell to the first end portion of the curved front face of the second open cell the second end portion of the curved front face of the first open cell having a second arc, the second tethered end of the second tail wall of the first open cell extending along the second arc and receiving the second portion of the first load, the first and second tail walls of the first open cell receiving and balancing the entire first load such that another of the plurality of open cells is not needed to balance the first load.

10. The sheet pile bulkhead of claim 9, wherein each of the first and second tail walls of each of the plurality of open cells is curved.

11. The sheet pile bulkhead of claim 10, wherein the curved front face of the second open cell is configured to have a second load applied thereto,
the second load is dividable into first and second portions, the first end portion of the curved front face of the second open cell has a third arc,
the first tethered end of the first tail wall of the second open cell extends along the third arc and receives the first portion of the second load,
the second end portion of the curved front face of the second open cell has a fourth arc,
the second tethered end of the second tail wall of the second open cell extends along the fourth arc and receives the second portion of the second load, and
the first and second tail walls of the second open cell receive and balance the entire second load applied to the curved front face of the second open cell such that another of the plurality of open cells is not needed to balance the second load applied to the curved front face of the second open cell.

12. The sheet pile bulkhead of claim 9, further comprising:
a third tail wall connected to the third connector, the third tail wall extending between the second tail wall of the first open cell and the first tail wall of the second open cell.

13. A method of repairing a sheet pile bulkhead comprising an X-wye connector, a cell, a damaged section, and an existing tail wall, the X-wye connector having first, second, third, fourth, and fifth connectors, the first connector being coupled to a first sheet pile section of the damaged section, the third connector being couplable to a third sheet pile section, the first and third sheet pile sections defining a first curved line, the second connector being coupled to a second sheet pile section of the cell, the fourth connector being couplable to a fourth sheet pile section, the second and fourth sheet pile sections defining a second curved line that crosses the first curved line and defines an X-like shape, and the method comprising:
installing a reinforcing tail wall configured to balance a load applied to the damaged section by the cell, the reinforcing tail wall comprising a first plurality of sheet pile sections arranged edge-to-edge and coupled together in a series, the first plurality of sheet pile sections including the fourth sheet pile section; and
connecting the fourth connector to the fourth sheet pile section of the reinforcing tail wall.

14. The method of claim 13 use with the reinforcing tail wall being a first reinforcing tail wall, the existing tail wall being a first existing tail wall, the X-wye connector being a first X-wye connector, the damaged section being connected to both a second existing tail wall and a front face by a second X-wye connector, the second X-wye connector having first, second, third, and fourth connectors, the first connector of the second X-wye connector being connected to the damaged section, the second connector of the second X-wye connector being connected to the second existing tail wall, the third connector of the second X-wye connector being connected to the front face, and the method further comprises:
installing a second reinforcing tail wall configured to balance a load applied to the damaged section by the front face, the second reinforcing tail wall comprising a second plurality of sheet pile sections arranged edge-to-edge and coupled together in a series; and
connecting the fourth connector of the second X-wye connector to the second reinforcing tail wall.

15. A sheet pile connector for use with a plurality of sheet pile sections each having an edge connector, the sheet pile connector comprising:
a central portion;

a first edge connector connected to the central portion, the first edge connector being configured to mate with the edge connector of a first one of the plurality of sheet pile sections;

a second edge connector connected to the central portion, the second edge connector being configured to mate with the edge connector of a second one of the plurality of sheet pile sections;

a third edge connector connected to the central portion, the third edge connector being configured to mate with the edge connector of a third one of the plurality of sheet pile sections, the first and third sheet pile sections forming a first curved line;

a fourth edge connector connected to the central portion, the fourth edge connector being configured to mate with the edge connector of a fourth one of the plurality of sheet pile sections, the second and fourth sheet pile sections forming a second curved line that crosses the first curved line to define an X-like shape; and a fifth edge connector connected to the central portion, the fifth edge connector being configured to mate with the edge connector of a fifth one of the plurality of sheet pile sections, the fifth sheet pile section being positioned between the third and fourth sheet pile sections, together the first, second, and fifth sheet pile sections defining a Y-like shape.

16. The sheet pile connector of claim 15, wherein
the fifth edge connector is connected to the central portion by a fifth arm that extends outwardly from the central portion and substantially bisects an inside angle defined between the third and fourth edge connectors.

17. The sheet pile connector of claim 15 formed by an extrusion process.

18. A sheet pile connector for use with a plurality of sheet pile sections each having an edge connector, the sheet pile connector comprising:

a central portion;

a first edge connector connected to the central portion by a first arm, the first edge connector being configured to mate with the edge connector of a first one of the plurality of sheet pile sections;

a second edge connector connected to the central portion by a second arm, the second edge connector being configured to mate with the edge connector of a second one of the plurality of sheet pile sections;

a third edge connector connected to the central portion by a third arm, the third edge connector being configured to mate with the edge connector of a third one of the plurality of sheet pile sections, the first and third arms being collinear along a first line;

a fourth edge connector connected to the central portion by a fourth arm, the fourth edge connector being configured to mate with the edge connector of a fourth one of the plurality of sheet pile sections, the second and fourth arms being collinear along a second line that crosses the first line to define an X-shape; and a fifth edge connector connected to the central portion by a fifth arm, the fifth edge connector being configured to mate with the edge connector of a fifth one of the plurality of sheet pile sections, the fifth arm being positioned between the third and fourth arms, together the first, second, and fifth arms defining a Y-shape.

* * * * *